United States Patent
Zalewski

(10) Patent No.: US 7,889,073 B2
(45) Date of Patent: Feb. 15, 2011

(54) LAUGH DETECTOR AND SYSTEM AND METHOD FOR TRACKING AN EMOTIONAL RESPONSE TO A MEDIA PRESENTATION

(75) Inventor: Gary Zalewski, Foster City, CA (US)

(73) Assignee: Sony Computer Entertainment America LLC, Foster City, CA (US)

(*) Notice: Subject to any disclaimer, the term of this patent is extended or adjusted under 35 U.S.C. 154(b) by 213 days.

(21) Appl. No.: 12/023,951

(22) Filed: Jan. 31, 2008

(65) Prior Publication Data
US 2009/0195392 A1 Aug. 6, 2009

(51) Int. Cl.
*G08B 1/08* (2006.01)
(52) U.S. Cl. .................. 340/539.25; 340/501; 340/500
(58) Field of Classification Search ............. 340/539.25
See application file for complete search history.

(56) References Cited

U.S. PATENT DOCUMENTS

| | | | |
|---|---|---|---|
| 5,984,880 A | | 11/1999 | Lander et al. |
| 6,001,065 A | * | 12/1999 | DeVito ...................... 600/544 |
| 6,904,408 B1 | * | 6/2005 | McCarthy et al. .............. 705/2 |
| 7,120,880 B1 | * | 10/2006 | Dryer et al. .................. 715/863 |
| 7,246,081 B2 | * | 7/2007 | Hill ............................ 705/10 |
| 2002/0196342 A1 | | 12/2002 | Walker et al. |
| 2003/0167908 A1 | | 9/2003 | Nishitani et al. |
| 2004/0117814 A1 | | 6/2004 | Roye |
| 2006/0143647 A1 | | 6/2006 | Bill |
| 2006/0293921 A1 | | 12/2006 | Mcarthly et al. |
| 2007/0016476 A1 | * | 1/2007 | Hoffberg et al. .............. 705/14 |
| 2007/0150916 A1 | | 6/2007 | Begole et al. |
| 2008/0169930 A1 | | 7/2008 | Mallinson |

OTHER PUBLICATIONS

PCT "Notification of Transmittal of the international Search Report and the Written Opinion of the International Searching Authority or the Declaration" issued in corresponding PCT Application No. PCT/US2008/050525 dated Jul. 8, 2008; 2 pages (86392PC).

(Continued)

*Primary Examiner*—Travis R Hunnings
(74) *Attorney, Agent, or Firm*—Michael A. Glenn; Glenn Patent Group

(57) ABSTRACT

Information in the form of emotional responses to a media presentation may be passively collected, for example by a microphone and/or a camera. This information may be tied to metadata at a time reference level in the media presentation and used to examine the content of the media presentation to assess a quality of, or user emotional response to, the content and/or to project the information onto a demographic. Passive collection of emotional responses may be used to add emotion as an element of speech or facial expression detection, to make use of such information, for example to judge the quality of content or to judge the nature of various individuals for future content that is to be provided to them or to those similarly situated demographically. Thus, the invention asks and answers such questions as: What makes people happy? What makes them laugh? What do they find interesting? Boring? Exciting?

29 Claims, 5 Drawing Sheets

OTHER PUBLICATIONS

PCT "International Search Report" issued in corresponding PCT Application No. PCT/US2008/050525, dated Jul. 8, 2009; 2 pages (86392PC).

PCT "Written Opinion of the International Searching Authority" issued in corresponding PCT Application No. PCT/US2008/050525 dated Jul. 8, 2008; 5 pages (86392PC).

Zyga, Lisa; "Sony Cameras Wait for Baby to Smile"; Jan. 25, 2008; http://www.physorg.com/new120487238.html.

Busso, et al.; "Analysis of Emotion Recognition using Facial Expressions, Speech and Multimodal Information"; Oct. 2004; Proc. of the ACM 6$^{th}$ International Conference on Multimodal Interfaces (ICMI 2004).

* cited by examiner

LAUGH DETECTOR AND SYSTEM AND METHOD FOR TRACKING AN EMOTIONAL RESPONSE TO A MEDIA PRESENTATION

FIELD OF THE INVENTION

Embodiments of this invention relate to interactive media. More particularly, embodiments of this invention relate to tracking an emotional response to a media presentation.

BACKGROUND OF THE INVENTION

Khiet P. Truong and David A. van Leeuwen, *Automatic discrimination between laughter and speech*, Speech Communication, Volume 49, Issue 2, February 2007, Pages 144-158 suggest a technique that detects laughter as a component of speech. As well, Carlos Busso, Zhigang Deng, Serdar Yildirim, Murtaza Bulut, Chul Min Lee, Abe Kazemzadeh, Sungbok Lee, Ulrich Neumann, Shrikanth Narayanan, *Analysis of Emotion Recognition using Facial Expressions, Speech and Multimodal Information*, Emotion Research Group, Speech Analysis and Interpretation Lab, Integrated Media Systems Center, Department of Electrical Engineering, Department of Computer Science, Viterbi School of Engineering, University of Southern California, Los Angeles, http://sail.usc.edu. have suggested a technique that detects emotion from facial expressions Unfortunately, there is as yet no suggestion to engage in passive collection of emotional responses during playback of media to judge or analyze the quality of segments of content or to assess the quality of content with respect to attributes of the content, user profiling, demographic mining and targeting of future content. Thus, there is a need in the art, for a technique that both recognizes emotion and that employs this information in some useful way.

SUMMARY OF THE INVENTION

The disadvantages associated with the prior art are overcome by embodiments of the present invention directed to a technique for passively collecting information in the form of emotional responses to a media presentation, tying this information to metadata, and using it to examine the content of the media presentation for what is good about the content and to project the information onto a demographic.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

An embodiment of the invention tracks an emotional response of an individual, for example to a media presentation, correlates that emotional response with the stimuli that caused it, and then aggregates resulting response data across a population of individuals, for example to assess an aspect of the media presentation, i.e. what aspects are good, are well received, have most entertainment value, and which are not as good, well received, or entertaining, e.g. Was it funny? What part of it was funny? Do people like that commercial? Is it, in fact, a commercial? Is that song making people smile?

Another embodiment of the invention simultaneously tracks the emotional response of multiple individuals during a media or other presentation. For example, a network device can be placed in a location that is profiled to have a certain number of users. Factors, such as face and voice detection, allow the system to match responses to particular individuals. In this way, a family may be profiled, a group may be profiled, for example by zip code, and the like. A calibration step would train the system to recognize each individual, for example by voice and facial features.

Thus, an embodiment of the invention tests human responses to a media presentation to identify appropriate and, conversely, inappropriate parts of expression in connection with the media presentation.

For purposes of the discussion herein, a media presentation may comprise, for example, but not by way of limitation, a television program, a movie, a live performance, recorded music, a sporting event, a video game, interactive entertainment, and the like. One embodiment of the invention comprises a sensor for detecting the emotional response of an individual to a media presentation, for example a laugh sensor, which in one embodiment comprises, for example, a microphone, a video camera, a combination of the two, or some other sensor, e.g. a device for measuring galvanic skin response, a heart rate monitor (EKG), motion detector, pressure sensor, and the like.

Figure 1:
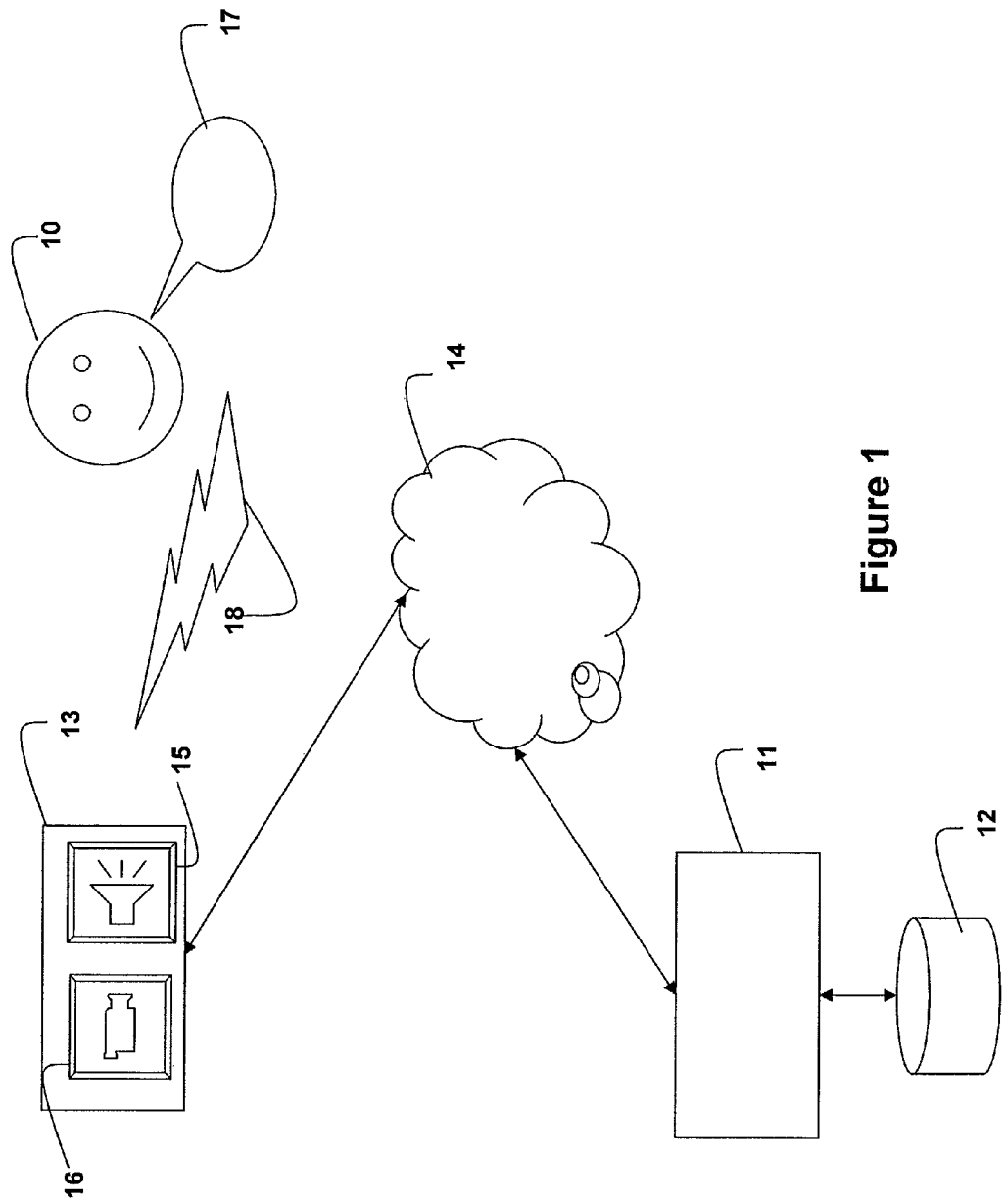
FIG. 1 is a block schematic diagram showing an embodiment of a system for tracking an emotional response according to the invention.

FIG. 1 is a block schematic diagram showing a system for tracking an emotional response according to the invention. In an embodiment that uses a microphone and/or video camera to detect laughter, once a laugh is detected, the stimuli that that individual was exposed to is identified and data are stored linking the presentation to the elicited response. In the simplest sense, the invention is implemented in a PC 13, such as a laptop computer that has a built in microphone 15 for capturing utterances and/or a video camera 16 for capturing gestures and/or facial expressions. An application installed and running on the PC, for example, watches the individual 10 surfing the Internet and detects an individual's utterance 17/18, such as laughter, or other sounds, such as applause or booing, at various points during the individual's session.

A further embodiment of the invention can provide a 3D camera, such as a ZCam™, which is manufactured by 3DV Systems, for capturing gestures, profiles, movement, and shapes. For example, a 3D camera may be used to recognize an individual based upon head shape, such as the shape of the individual's nose, size, body shape, and the like. This is particularly useful if the invention is used to track emotional responses of more than one person at a time and/or if an individual's face is not presented to the camera. Further, this aspect of the invention allows both the tracking of gestures or other body movement as indications of emotional response, and the linking of such gestures and body movement to other indications of emotional response, such as laughter. Additionally, the interaction of more than one individual may be tracked and used to identify an emotional response, such as when two individuals give each other a "High Five."

Yet another embodiment provides a smile detector, such as the Cyber-Shot W120, which is manufactured by Sony, and which incorporates face detection and smile detection features.

One embodiment of the invention may be configured to provide a network connection 14 that is used to forward captured information that is representative of the individual's response to the media presentation to a server 11 correlates the individual's response, i.e. laughter, with the portion of the media presentation that was making this person laugh. Those skilled in the art will recognize that a network and server are not necessary to operation of the invention, and that the invention could just as well be implemented locally. The invention also identifies any metadata associated with that media, for example, to establish a profile for the individual. The individual's response itself is detected by any such technique as a look up and compare between the individual's response and those known to comprise, for example, laughter with reference to a database 12. These known responses can be any of audio and or video, for example the sounds of laughter and/or the facial expressions associated with laughter. A timeline is maintained for the media presentation and the timeline is annotated each time an individual's response is detected.

While the example so far describes the detection of laughter, those skilled in the art will appreciate that the invention detects other emotions, for example sadness, excitement, anger, joy, interest, boredom, tone, and the like. For example, boredom could be indicated by the user looking away from the presentation, yawning, or talking over the presentation; interest could be shown by quiet or the user intensely looking at the presentation. The invention could also track the level or intensity of the emotion, e.g. how long and how loudly a user laughs can indicate how funny a scene is.

Further, the type of individual response detected is linked to the portion of the media presentation that invoked such response. Thus, some individuals may respond to a particular portion of a presentation with laughter, while others may respond with disgust. The invention collects these responses across a large population of individuals and may develop an overall understanding of the emotional effect of each response-invoking portion of the media presentation.

Accordingly, an embodiment of the invention identifies detectable, emotional, visceral responses and then identifies any of the type of media presentation that was associated with the response, the time at which the response occurred during the media presentation, the location of the media presentation that caused response, and value of the response for either profiling for such uses as presenting future targeted advertisements or for collecting group responses to identify presentations or portions of presentations of particular merit.

An embodiment applies information collected as set forth above during a media presentation to develop a profile, for example, a profile for targeting advertising based upon group response to media presentations or to particular aspects of media presentations. The invention asks and answers such questions as: What makes people happy? What makes them laugh? What do they find interesting? Boring? Exciting? In particular, the invention gathers this invention passively, such that each individual is only observed and is not asked to volunteer responses. This is valuable because only certain individuals are willing to volunteer to offer an opinion and, as such, only that portion of a population participates in a poll. This tends to skew the results obtained. By merely collecting the unsolicited response of individuals to a media presentation, the invention identifies accurately the response of an entire group of individuals.

Figure 2:
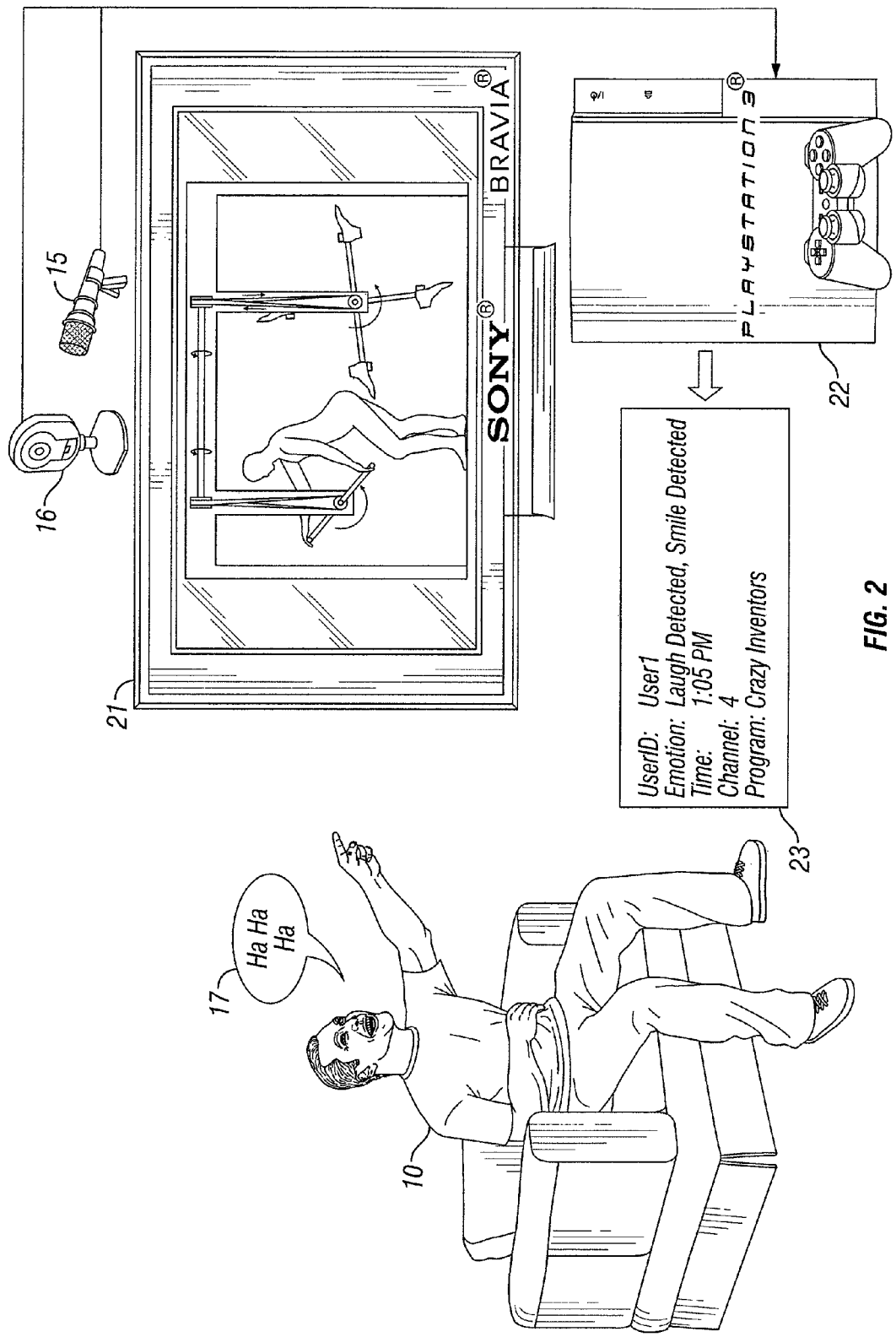
FIG. 2 is a block schematic diagram showing a further embodiment of a system for tracking an emotional response according to the invention.

FIG. 2 is a block schematic diagram showing a further embodiment of a system for tracking an emotional response according to the invention. In FIG. 2, an individual 10 is shown in his living room laughing riotously 17 at a program on his television 21. A camera 16 records the individual's facial expressions during the presentation. His vocal responses are captured by a microphone 15. The video and audio captured, respectively by the camera and microphone, are coupled to a game console 22 which identifies the user, the emotion detected, e.g. a laugh and a smile was detected, the time at which the emotion was detected, the channel (in the case of a television program), and the program title. This information may be used locally or may be sent over a network connection for further processing, as discussed herein. Other information may be associated with the individual's information, such as a user profile, a demographic value, for example based upon the individual's zip code, cable TV provider, and the like.

Figure 3:
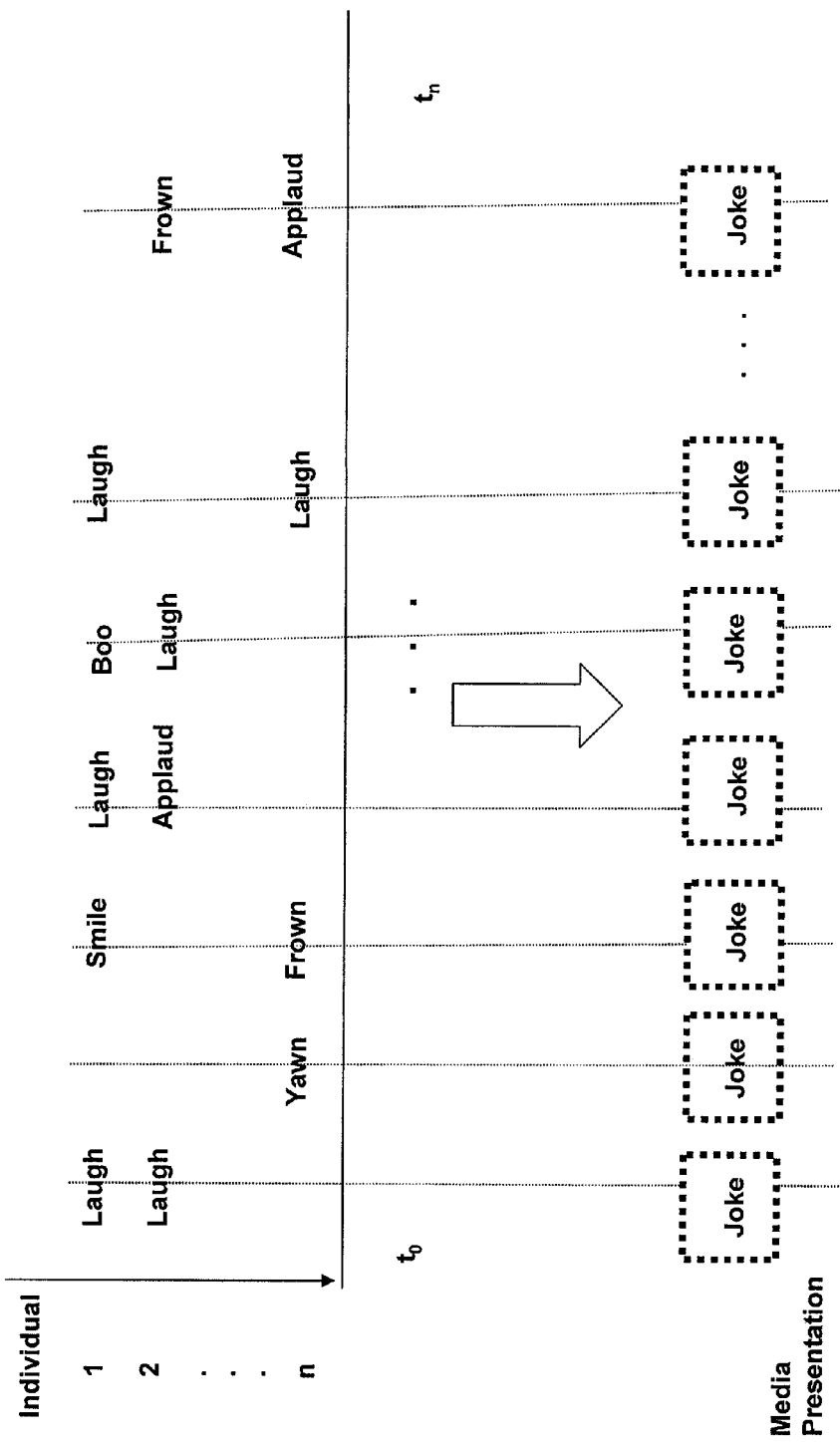
FIG. 3 is a schematic representation of a media presentation showing a stream of media frames and corresponding metadata according to the invention.

FIG. 3 is a schematic representation of a media presentation showing a stream of media frames and corresponding metadata according to the invention. In FIG. 3, individuals 1 through n watch a media presentation that includes several jokes which are presented over a span of time the comprises the presentation. The response of each individual to each joke is detected and correlated with the joke.

Figure 4:
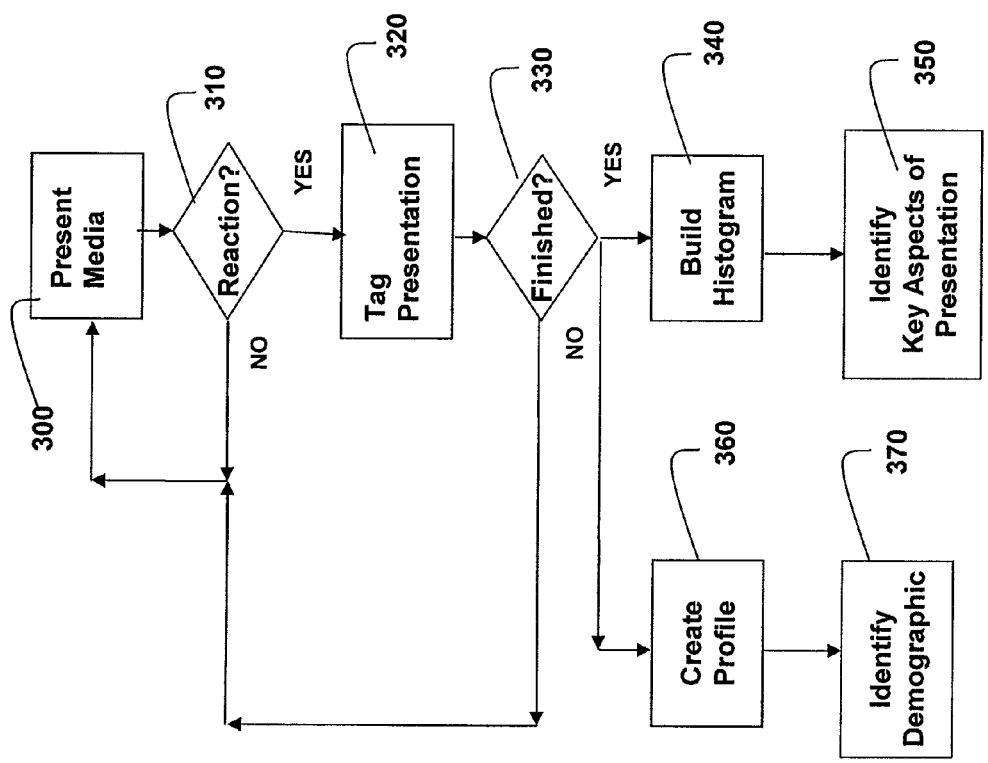
FIG. 4 is a flow diagram showing detection and processing of information related to an emotional response in connection with a media presentation according to the invention.

FIG. 4 is a flow diagram showing detection and processing of information related to an emotional response in connection with a media presentation according to the invention. Further to FIG. 3, FIG. 4 shows the flow of a media presentation session. A media presentation is made to one or more individuals (300) and the reactions of the individuals is detected (310). Each time a reaction occurs for each individual, the presentation is tagged (320) to identify the reaction, the individual, and the portion of the presentation that elicited the response given by the individual. Once the presentation is completed (330), the information collected is used to both create a profile for each individual and for the individuals as a group (360) to identify individual and group demographics (370); and to build a histogram (340) that is used to identify key aspects of the presentation (350) with regard to such factors as merit, ability to evoke an intended response, and the like.

Figure 5:
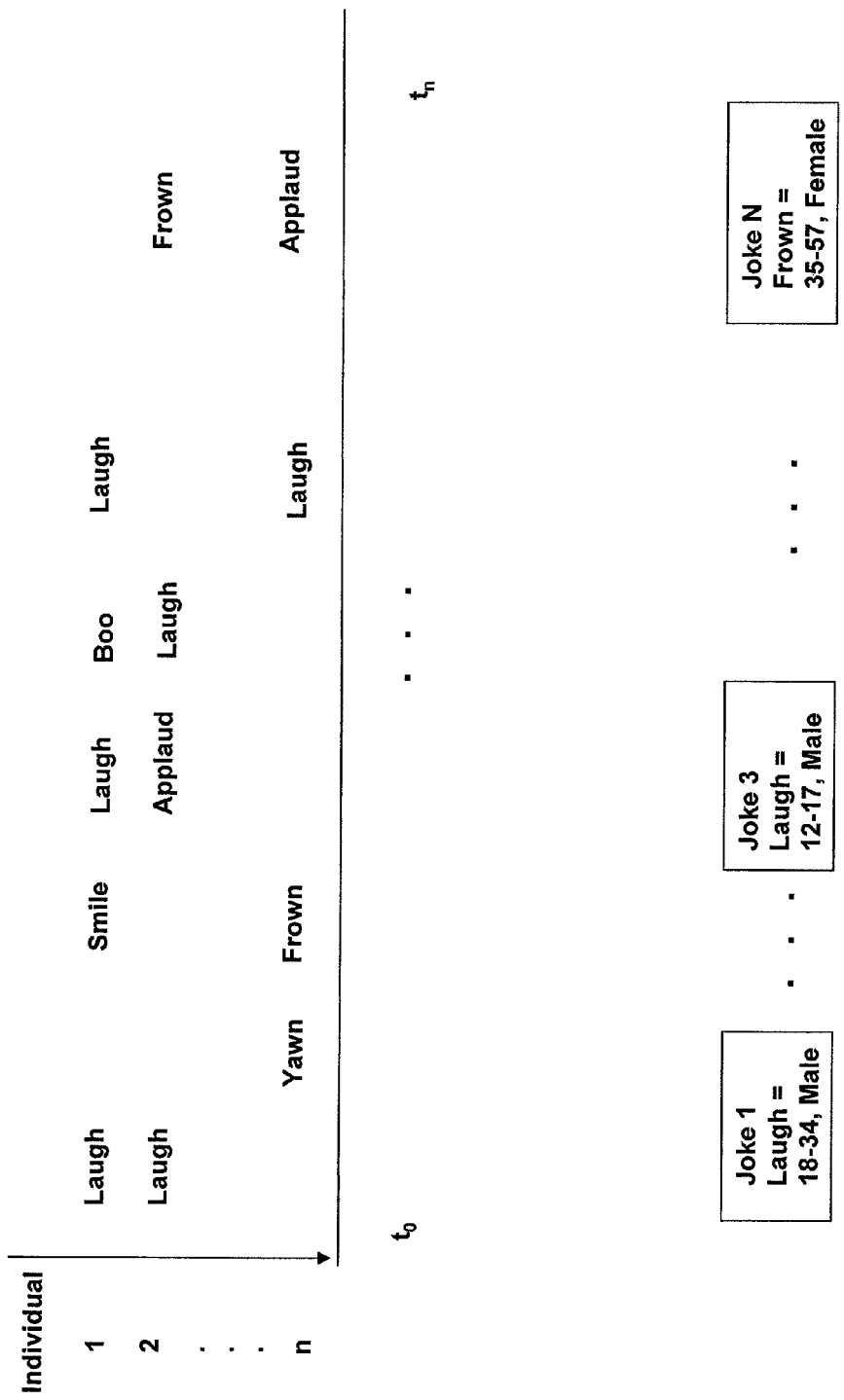
FIG. 5 is a block schematic diagram showing association of metadata with individual and group profiles in connection with establishing one or more demographics according to the invention.

FIG. 5 is a block schematic diagram showing association of metadata with individual and group profiles in connection with establishing one or more demographics according to the invention. The upper portion of FIG. 5 shows the presentation timeline of FIG. 3. The lower portion of FIG. 5 shows a demographic generated from the detected individual responses. For example, Joke 1 produced laughter with individuals 1 and 2, and thus was found to fit into the demographic comprised of males, ages 18-34, based upon the profiles of individuals 1 and 2. Likewise, Joke 3 produced a smile from individual 1, but a frown from individual n. Thus, Joke 3 was found to fall within the demographic for males, ages 12-17. Finally, Joke N produced a frown for individual 2 and applause for individual n. In this case, it was determined that Joke N produced a reaction within a demographic for females, aged 35-57. The example of FIG. 5 is much simplified for purposes of explanation of the invention. In practical application, sample groups may be much larger to develop an effective demographic. Further, the invention need not be applied to a group, but may be used with a single individual to identify the individual's demographic, for example, for purposes of targeted advertising.

It should be noted that, while the invention is described in terms of a media presentation, the presentation can be a live presentation or any other event that an individual may observe or participate in. For example, an individual's responses may be collected during his interaction with a video game, during a Web browsing session, or while attending a live event. Thus, it would be very valuable to have, for example, a laugh sensor used in association with a set top box that determines when people in that living room at that location are laughing in response to what they are watching. Further, it is not just what they are watching that is significant, but specifically what is it about the presentation that produces a viewer response, such as laughter, i.e. which joke was considered funny. Thus, the invention comprehends levels of metrics that can be used to find out exactly what the frames of what sequences of what presentations are capable of provoking a response in an individual and, in coordination with the individual's profile, what traits does an individual who responded in this way have. Based upon this information, the individual may be shown advertisements in the future that are more in line with those things the individual responds to positively, or presentations may be made to groups having similar traits to those of the observed individual with some assurance of a positive reception by those viewing such presentations.

Accordingly, there are at least two valuable uses can be made of the information collected with the invention. One use is to judge the quality of the content. The other use is to judge the nature of various individuals for future content that is to be provided to them or to those similarly situated demographically.

In the latter case, when the user is profiled over time during the media presentation, there is a media stream, for example displayed at 30 frames per second as on a TV screen, and a microphone connected to a laugh sensor, more generically, an emotional-sensor. In the example of a laugh sensor, a laugh is an utterance that is very easy to detect and, when it is detected at various referential points an embodiment of the invention adds corresponding metadata to the media stream down to a time reference element, for example the frame level, and even down to the objects that are in that frame. At the frame level, it would be useful to understand, for example, if there is a red car, a Volkswagen, a pen, a picture frame; is there a lot of green; does the action take place in a golf course; if the amount of saturation of color is defined, how much color is there; is it a dark scene, etc. Thus, the metadata is rich and is associated with the actual presentation stream at any frame instant over time. Attributes of the frame or sequence of frames can be inter-related in the metadata, such that the invention accounts for latency, for example what built up to the punch line of a joke. Thus, a context for an individual's response can be determined from such metadata.

Thus, the metadata stream provides an additional set of uses because it provides an understanding of what triggers the utterance. As discussed above, the utterance could be picked up by a microphone; it could be picked up by a camera; it could be picked up by an EKG or galvanic skin response device, for example. Thus, an embodiment of the invention detects an emotional state. In one embodiment, these detection mechanisms are part of an entertainment device or game console, or may be built into, for example, a remote control. For example, a fingerprint sensor on a remote control may be used in connection with detection of an utterance or emotional state to determine also who, for example, is changing the channel. One use of this information is to provide dynamic advertising at the biometric level of detecting the identity of the individual, at least with regard to the individual's profile, as well as the individual's emotional state.

The invention thus comprehends capturing information related to an individual comprising any of audio, video, biometric, and motion, e.g. via a motion detector. As discussed above, a basic embodiment comprises detecting a laugh utterance, for example, using a speech recognition system.

Not only does the invention identify an individual's profile, but the individual's profile may further identify a network of friends and shared networks, as well as a demographic, and other classes into which the individual may be placed. The invention can be placed broadly into a media presentation stream, such as set top boxes, network enabled game consoles, such as a Sony PlayStation, remote controls, and the like. The invention thus contemplates integration into a network in which all of the data captured from detecting emotional responses within the population allows targeting of any demographic. As a result, an analyst can ask, for example, "Go back to the emotion. What makes these people laugh?" The invention can then return, for example, a histogram of the Top Ten things that caused this response. An analyst can then get to specific target markets, for example, to look at an average distribution within a particular age range with regard to the number-one, the number-two, three-, and four-ratings within the histogram. In this regard, the level of data mining provided in connection with this embodiment of the invention allows identification of any individuals who fall outside the standard distribution. Thus, the invention provides a form of focus group that is generated in real time based upon information that is passively captured and that identifies the reaction of one or more individuals to, for example, a media presentation.

The invention need not be limited to audio-visual presentations. For example, if a song is played and a person is smiling or if he is singing along with the song, then the invention is used to capture that useful information. If at an event people are cheering, then the invention is used to capture that useful information. For example, at a sporting event the invention could be used to tell whether an audience likes one team more than another.

Accordingly, the invention provides a method and apparatus for passively collecting information in the form of emotional responses to a media presentation, tying this information to metadata to a timeline, e.g. at a frame level, and then using it both to examine the content of the media presentation for what is good about the content and, also, to project the information onto a demographic. As a result, for example, the next time an individual turns his television set, the individual's cable provider can serve ads that are more interesting to the individual.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An apparatus for using information in the form of passively collected emotional responses to a media presentation that is made to one or more individuals, comprising:
   a media presentation perceivably exhibited to at least one individual having a profile;
   a detector for passively capturing emotional responses of said at least one individual to said media presentation during exhibition of said media presentation;
   a processor for producing a correlation that reflects a relationship between said at least one individual's emotional responses and at least one portion of said media presentation which contained stimuli that elicited said emotional responses;
   said processor identifying at least one group having a profile that is similar to the profile of said at least one individual;
   wherein at least one or more of said portions of said media presentation is perceivably exhibited to said group;
   wherein the at least one or more of said portions of said media that are perceivably exhibited to said group are selected based upon said correlation between said at least one individual's emotional responses and at least one portion of said media presentation that contained stimuli that elicited said emotional response; and
   wherein the at least one or more of said portions of said media that are perceivably exhibited to said group are presented to said group with some assurance of a positive reception by said group.

2. The apparatus of claim 1, further comprising:
   said processor adapted to aggregate resulting emotional response data across a population of individuals to assess at least one aspect of said media presentation.

3. The apparatus of claim 1, further comprising:
   said processor adapted to aggregate resulting emotional response data for an individual to establish a user profile in connection with at least one aspect of said media presentation.

4. The apparatus of claim 1, said processor further adapted to tie said resulting emotional response data to a media presentation timeline.

5. The apparatus of claim 4, said processor further adapted to tie said resulting emotional response data to a media presentation timeline at a frame level.

6. The apparatus of claim 1, said processor adapted to examine said media presentation content pursuant to said assessment of said at least one aspect of said media presentation.

7. The apparatus of claim 1, said processor adapted to project said resulting emotional response data onto one or more demographic categories.

8. The apparatus of claim 1, said processor adapted to use said emotional responses to said media presentation to identify appropriate and, conversely, inappropriate parts of expression in connection with said media presentation.

9. The apparatus of claim 1, said detector comprising any of:
   a microphone for capturing utterances, a video camera for capturing gestures and/or facial expressions, an EKG, or a galvanic skin response device.

10. The apparatus of claim 1, said processor adapted to identify any metadata associated with said media presentation to establish a profile for said at least one individual.

11. The apparatus of claim 1, said emotional responses comprising any of:
   laughter, excitement, interest, boredom, joy, sadness, anger, tone, and intensity and/or duration of the emotional response.

12. The apparatus of claim 1, said processor adapted to collect said emotional responses across a large population of individuals and to determine an overall understanding of the emotional effect of each response-invoking portion of said media presentation.

13. A method for using information in the form of passively collected emotional responses to a media presentation that is made to one or more individuals, comprising the steps of:
   perceivably exhibiting a media presentation to at least one individual having a profile;
   passively identifying detectable, emotional, visceral responses of said at least one individual to at least a portion of said media presentation; and
   identifying any of the type of media presentation that was associated with said responses, the time at which said responses occurred during said media presentation, the location of said media presentation that caused said responses, and a value of said responses for either profiling for or for collecting group responses, said identified value being used for the steps of:
   associating metadata with individual and group profiles;
   producing a correlation that reflects a relationship between said at least one individual's emotional responses and at least one portion of said media presentation which contained stimuli that elicited said emotional responses;
   identifying at least one group having a profile that is similar to the profile of said at least one individual;
   wherein at least one or more of said portions of said media presentation is perceivably exhibited to said group;
   wherein the at least one or more of said portions of said media that are perceivably exhibited to said group are selected based upon said correlation between said at least one individual's emotional responses and at least one portion of said media presentation that contained stimuli that elicited said emotional response; and
   wherein the at least one or more of said portions of said media that are perceivably exhibited to said group are presented to said group with some assurance of a positive reception by said group.

14. The method of claim 13, said identified value being used to establish a profile for the step of:
   presenting future targeted advertisements.

15. The method of claim 13, said identified value being used to collect a group response for the step of:
   identifying media presentations or portions of media presentations of particular merit.

16. The method of claim 13, said identified value being used for the step of:
   building a histogram to identify key aspects of said media presentation with regard to one or more predetermined factors.

17. The method of claim 13, said identifying step further comprising the step of:
   identifying specific frames of specific sequences of said media presentation that provoke an emotional response in an individual.

18. The method of claim 13, further comprising the steps of:
   in coordination with an individual's profile, identifying traits of individual who demonstrated an emotional response to said media presentation; and correlating said traits to those portions of said media presentation that elicited said emotional response.

19. The method of claim 17, further comprising the step of: identifying objects within at least one specific frame in connection with said emotional response.

20. The method of claim 13, further comprising the step of: identifying a temporal sequence within said media presentation that lead up to an emotional response.

21. The method of claim 13, further comprising the step of: providing said individual with a biometric detection mechanism for use in connection with detection of an emotional response to link an identity for said individual's with said emotional response.

22. The method of claim 13, further comprising the step of: identifying said individual's profile.

23. The method of claim 22, further comprising the step of: using said individual's profile to identify any of a network of friends, shared networks, and a demographic into which said individual may be placed.

24. The method of claim 13, further comprising the step of: targeting advertising in specific markets for delivery to said individual based upon said individual's emotional reaction to said media presentation.

25. The method of claim 13, said step of passively identifying detectable, emotional, visceral responses of said at least one individual to at least a portion of said media presentation further comprising the step of:
capturing any of gestures, profiles, movement, and shapes with a 3D camera for any of recognizing an individual, tracking emotional responses of more than one person at a time, tracking of gestures or other body movement as indications of emotional response, linking of gestures and/or body movement to other indications of emotional response, and identifying an emotional response of two or more individuals.

26. An apparatus for using information in the form of passively collected emotional responses to a media presentation that is made to one or more individuals, comprising:
a media presentation perceivably exhibited to a plurality of individuals, each individual having a profile;
a detector for passively and simultaneously capturing emotional responses of multiple individuals to said media presentation during exhibition of said media presentation; and
a processor for producing a correlation that reflects a relationship between said at least one individual's emotional responses and at least one portion of said media presentation which contained stimuli that elicited said emotional responses;
said processor identifying at least one group having a profile that is similar to the profile of at least one of said individuals;
wherein at least one or more of said portions of said media presentation is perceivably exhibited to said group;
wherein the at least one or more of said portions of said media that are perceivably exhibited to said group are selected based upon said correlation between said at least one individual's emotional responses and at least one portion of said media presentation that contained stimuli that elicited said emotional response; and
wherein the at least one or more of said portions of said media that are perceivably exhibited to said group are presented to said group with some assurance of a positive reception by said group.

27. The apparatus of claim 26, further comprising:
a network device placed in a location, said network device profiled to have a predetermined number of users; and
said processor programmed to use any of face and voice detection to match detected emotional responses with particular individuals who exhibited such emotional responses.

28. The apparatus of claim 26, further comprising:
said processor programmed to perform a calibration procedure to train said apparatus to recognize each individual of said plurality of individuals by any of voice and facial features.

29. A method for using information in the form of passively collected emotional responses of one or more individuals to a media presentation, comprising:
perceivably exhibiting a media presentation to at least one individual having a profile;
passively capturing emotional responses of said at least one individual to said media presentation during exhibition of said media presentation;
producing a correlation that reflects a relationship between said at least one individual's emotional responses and at least one portion of said media presentation that contained stimuli that elicited said emotional response;
identifying at least one group having a profile that is similar to the profile of said at least one individual;
perceivably exhibiting at least one or more of said portions of said media presentation to said group;
wherein the at least one or more of said portions of said media that are perceivably exhibited to said group are selected based upon said correlation between said at least one individual's emotional responses and at least one portion of said media presentation that contained stimuli that elicited said emotional response; and
wherein the at least one or more of said portions of said media that are perceivably exhibited to said group are presented to said group with some assurance of a positive reception by said group.

* * * * *